(12) United States Patent
Osada

(10) Patent No.: US 6,986,400 B2
(45) Date of Patent: Jan. 17, 2006

(54) SCOOTER-TYPE MOTORCYCLE

(75) Inventor: Hiroshi Osada, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 10/919,395

(22) Filed: Aug. 17, 2004

(65) Prior Publication Data
US 2005/0045400 A1 Mar. 3, 2005

(30) Foreign Application Priority Data
Aug. 28, 2003 (JP) .............................. 2003-304691

(51) Int. Cl.
*B62K 11/00* (2006.01)

(52) U.S. Cl. ..................... 180/228; 180/296
(58) Field of Classification Search ................ 180/219, 180/228, 309, 291, 292, 296
See application file for complete search history.

(56) References Cited

U.S. PATENT DOCUMENTS

| | | | | |
|---|---|---|---|---|
| 5,845,618 A * | 12/1998 | Taue et al. ................... | 123/317 |
| 6,644,693 B2 * | 11/2003 | Michisaka et al. .......... | 280/835 |
| 2002/0139596 A1 * | 10/2002 | Yagisawa et al. ............ | 180/219 |
| 2002/0148665 A1 * | 10/2002 | Yagisawa et al. ............ | 180/219 |
| 2002/0166709 A1 * | 11/2002 | Michisaka et al. .......... | 180/219 |
| 2002/0189877 A1 * | 12/2002 | Yagisawa et al. ............ | 180/219 |
| 2003/0111283 A1 * | 6/2003 | Hakamata et al. .......... | 180/219 |
| 2003/0132837 A1 * | 7/2003 | Hasegawa et al. .......... | 340/440 |

* cited by examiner

*Primary Examiner*—Kevin Hurley
(74) *Attorney, Agent, or Firm*—Oblon, Spivak, McClelland, Maier & Neustadt, P.C.

(57) ABSTRACT

A scooter-type motorcycle has a structure in which an article accommodation box is disposed below a rider's seat which is upward openable, and a power unit including an engine and a power transmission is disposed below the article accommodation box to be vertically swingable together with a rear wheel. The power unit is connected to a swing shaft which is disposed above a front portion of an engine crank case, and a starter motor for starting an operation of the engine is disposed above a rear portion of the crank case. An air cleaner, a suction pipe, a throttle body and an intake manifold are arranged substantially horizontally from a rear side portion of a motorcycle body towards a front side portion thereof so as to constitute an engine intake device to be connected to the engine. The throttle body is disposed between the swing shaft and the starter motor.

8 Claims, 4 Drawing Sheets

SCOOTER-TYPE MOTORCYCLE

BACKGROUND OF THE INVENTION

1. Field of the Invention

The present invention relates to a motorcycle particularly of scooter-type provided with an article accommodation (storage) box having large inner volume capable of accommodating a helmet or like, the article accommodation box being disposed below a rider's seat.

2. Related Art

A scooter-type motorcycle of the above structure is known, for example, from Japanese Patent Laid-open (KO-KAI) Publication No. 2001-138975 or No. HEI 2-92791 (92791/1990). One example of such scooter-type motorcycle is, for example, shown in FIG. 4.

With reference to FIG. 4, the scooter-type motorcycle is provided with a power unit 104, including an engine 101 and a power transmission 102, which is vertically swingable together with a rear wheel 103. Such power unit 104 is disposed below an article accommodation box (or article storage chamber) 105. A cylinder 107 of the engine 101 extends forward from a front surface side of a crank case 106 of the engine 101 at a portion directly below the bottom surface 105a of the article accommodation box 105. A rider's seat 108 is disposed above the article accommodation box 105 to be openable about a rotational shaft 108a. In FIG. 4, reference numeral 109 denotes a helmet disposed in the accommodation box 105.

In the conventional structure of the scooter-type motorcycle, such as shown in FIG. 4, the engine 101 is generally arranged below the rider's seat 108 in consideration of the structure of the motorcycle body, and therefore, a two-stroke-cycle engine is mainly mounted in an attitude as low as possible by almost horizontally laying the cylinder.

In recent years, however, a four-stroke-cycle engine has been mainly employed in view of environmental matters. In the four-stroke-cycle engine, an oil stored in a bottom portion of the crank case 106 is supplied to the cylinder (i.e., cylinder head) 107 by means of oil pump, and the oil circulation from the cylinder 107 to the crank case 106 is performed through dropping due to the gravity. Because of this reason, in order to facilitate the oil circulation, the cylinder 107 has a front side portion extending obliquely upward in comparison with the arrangement in the two-stroke-cycle engine.

However, in the arrangement that the cylinder 107 extends forward from the front surface side of the crank case 106 at the portion directly below the bottom surface 105a of the article accommodation box 105, if the cylinder 107 is arranged with the front side portion thereof extending forward with an upward inclination in consideration of the well oil circulation, there may cause a fear that the cylinder 107 interferes with the bottom surface 105a of the accommodation box 105.

In order to obviate such fear, it will be necessary to arrange the accommodation box 105 so that the bottom surface 105a thereof is positioned at a higher level or to dispose both the accommodation box 105 and the rider's seat to be higher in its level in their entire structure, which adversely results in the reduction of the inner volume of the article accommodation box 105 or deterioration of the riding condition, footing condition or like of the motorcycle.

Moreover, on the upper surface portion of the crank case 106, there are disposed a swing shaft 111 being a center of pivotal movement of the power unit 104, a starter motor 112 for the engine operation, an intake device 113 of the engine and so on, and accordingly, it is necessary to consider the interference of these members with the bottom surface 105a of the article accommodation box 105. That is, it is obliged to pay attention to the arrangement of the members on the crank case 107 (i.e., the power unit 107) and the entire shape or size of the article accommodation box 105.

SUMMARY OF THE INVENTION

The present invention was conceived in consideration of the above matters encountered in the prior art, and an object of the present invention is hence to provide a scooter-type motorcycle capable of ensuring a large inner volume of an article accommodation box and suppressing the rider's seat to be low even with an equipment of a four-stroke-cycle engine.

This and other objects can be achieved according to the present invention by providing a scooter-type motorcycle having a structure in which an article accommodation box having an upper opening is disposed below a rider's seat which is upward openable, and a power unit including an engine and a power transmission is disposed below the article accommodation box to be vertically swingable together with a rear wheel, the engine including a crank case from which a cylinder extends forward, wherein a swing shaft of the power unit is disposed above a front portion of the crank case, a starter motor for starting an operation of the engine is disposed above a rear portion of the crank case, an engine intake device, including an air cleaner, a suction pipe, a throttle body and an intake manifold, which are arranged substantially horizontally from a rear side portion of a motorcycle body towards a front side portion thereof, is connected to the engine, and the throttle body is disposed between the swing shaft and the starter motor.

In a preferred embodiment of the above aspect, it may be desired that the throttle body and the suction pipe are disposed in a manner offset from the longitudinal center line of the motorcycle body on one side in a width direction thereof the motorcycle body in its plan view, and the article accommodation box has a bottom surface portion having a rear side end which is circularly protruded at a central portion thereof.

The article accommodation box preferably has an inner space in which a full-covered type (full-face cover type helmet) is accommodated with a top portion thereof directed upward and a front side portion directed rearward. The bottom surface of the article accommodation box has an inclination rearward downward in a side view of the motorcycle body.

It may be further desired that the engine cylinder extends forward slightly upward from a front surface portion of the crank case.

A fuel tank may be disposed on a rear side of the article accommodation box and has an oiling port disposed below the rider's seat. In an alternation, the fuel tank may be disposed below a low-floor type step board provided for the body frame.

In a modified aspect of the present invention, there may be provided a scooter-type motorcycle comprising:

a motorcycle body frame having a low framework structure;

a front wheel and a rear wheel which are operatively supported by the body frame;

a rider's seat disposed at a rear side upper portion of the body frame to be upward openable;

an article accommodation box having an upper opening and disposed below the rider's seat;

a power unit including an engine and a power transmission and disposed below the article accommodation box to be vertically swingable together with the rear wheel, the engine including a crank case from which a cylinder extends forward;

a swing shaft disposed above a front portion of the crank case for coupling the power unit to the body frame;

a starter motor disposed above a rear portion of the crank case for starting an operation of the engine; and an engine intake device connected to the engine, the engine intake device including an air cleaner, a suction pipe, a throttle body and an intake manifold, which are arranged substantially horizontally from a rear side portion of the motorcycle body towards a front side portion thereof, and the throttle body being disposed between the swing shaft and the starter motor.

According to the present invention of the structures and characters mentioned above, the throttle body, which has a vertical dimension larger than that of the intake manifold or suction pipe, is disposed in a recessed portion between the swing shaft and the starter motor, which are disposed on the front and rear sides of the crank case, respectively, so that the upward projection of the throttle body can be prevented to thereby make lower the entire structure of the power unit. Therefore, the bottom surface of the article accommodation box can be lowered in level, so that the inner volume thereof can be increased. Otherwise, the rider's seat may be lowered in level.

According to the embodiment, in which the throttle body and the suction pipe are disposed in a manner offset on one side in a width direction of the motorcycle body, and the bottom surface portion has a rear side end which is circularly protruded at a central portion thereof, the interference of the suction pipe with the bottom surface of the article accommodation box can be prevented at a time when the power unit is rotated, and in addition, the inner volume of the accommodation box can be relatively increased.

Moreover, the full-covered type helmet can be accommodated with a top portion thereof directed upward and a front side portion, having a relatively small radius of curvature, directed rearward in the accommodation box in a manner, so that the rear side of the bottom surface of the accommodation box can be finely tapered, also preventing the interference of the suction pipe.

Furthermore, the bottom surface of the accommodation box has an inclination rearward downward in a side view of the motorcycle body, so that the engine cylinder is disposed to be forward slightly upward, thus improving the oil circulation performance without interfering with the bottom surface.

The nature and further characteristic features of the present invention will be made more clear from the following descriptions made with reference to the accompanying drawings.

DESCRIPTION OF THE PREFERRED EMBODIMENT

Figure 1:
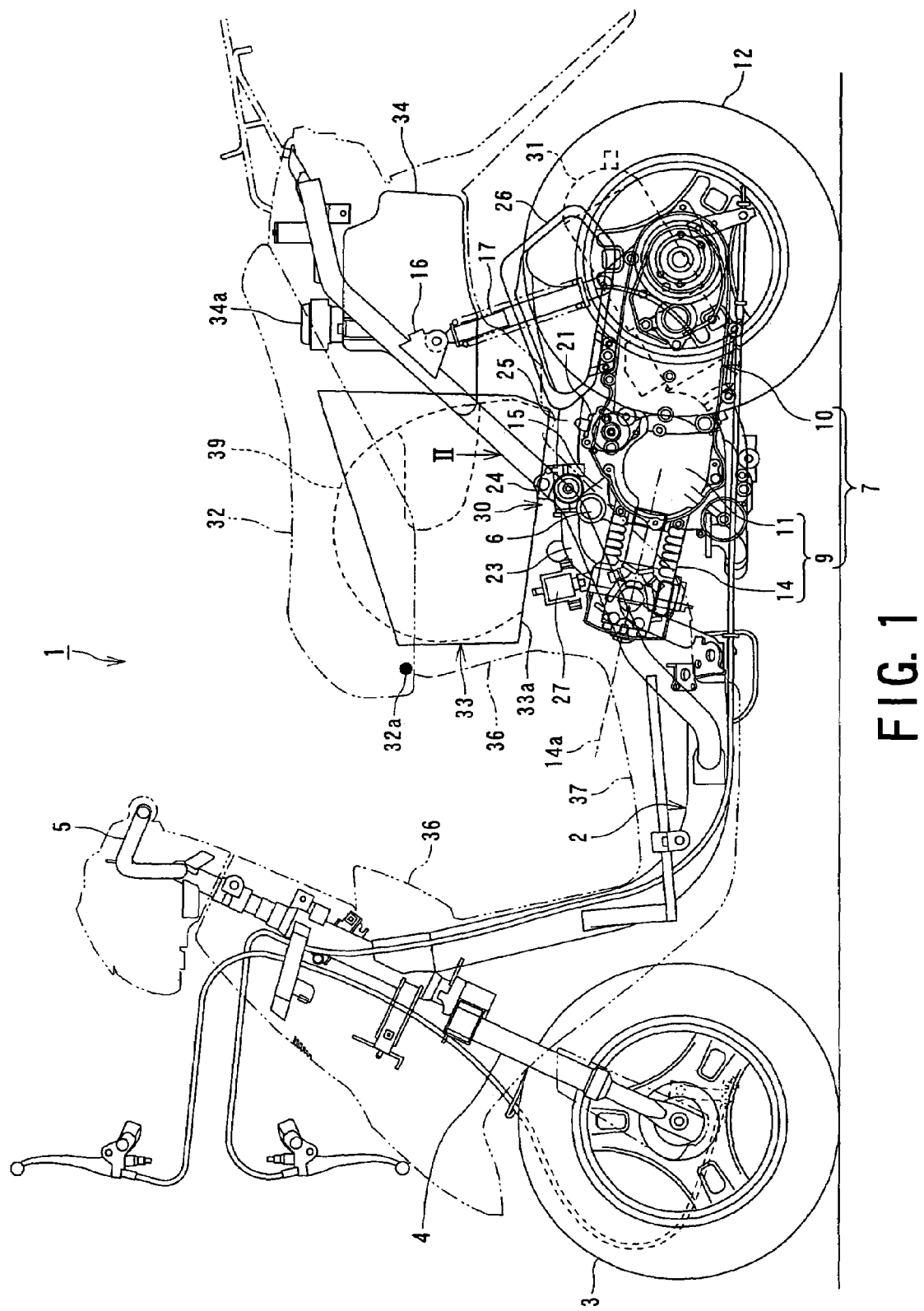
FIG. 1 is a left side view showing one embodiment of a scooter-type motorcycle to which the present invention is applicable.

A preferred embodiment of the present invention will be described hereunder with reference to FIG. 1 showing a left side view of the scooter-type motorcycle to which the present invention is applicable.

The scooter-type motorcycle 1 is provided with a body frame 2 of low framework structure made of steel. The body frame 2 has a front head portion to which a front fork 4 and a handle bar 5, which support a front wheel 3, is journaled, and a power unit 7 is connected, at a central lower portion of the body frame 2, to a swing shaft 6 extending in the width direction thereof.

The power unit 7 is of a standard structure as a scooter-type motorcycle provided with a four-stroke-cycle single-cylinder engine 9 and a power transmission (unit) 10, which are integrally assembled. The power transmission 10 is disposed on the left side portion, as viewed, of a crank case 11 of the engine 9, and a rear wheel 12 is journalled to the most rear right side portion of the power transmission 10. In the power transmission 10, there are also arranged a speed-changing gear for changing the speed of the power, i.e., engine revolution, and a speed reduction unit for further reducing the engine power, which is then transmitted to the rear wheel 12.

The engine 9 is accommodated with a cylinder 14 extending forward from the front surface of the crank case 11 in an attitude extending slightly obliquely forward in consideration of the oil circulation from the cylinder 14, i.e., cylinder head, to the crank case 11.

The body frame 2 and the power unit 7 is coupled by means of swing shaft 6 at a position above the front portion of the crank case 11. A lateral pair of swing brackets 15 (see FIG. 2) formed on the upper surface of the crank case 11 so as to project therefrom are connected to the swing shaft 6. A rear cushion unit 17 is also arranged between the rear portion of the power transmission 10 and a cushion bracket 16 mounted to the rear portion of the body frame 2, and this rear cushion unit 17 serves as a shock absorber.

When the scooter-type motorcycle 1 runs, the power unit 7 is vertically swung about the swing shaft 6, together with the rear wheel 12, in accordance with the irregularity of the road on which the motorcycle runs, and this swing motion is buffered and decompressed through the shrinkage of the rear cushion unit 17.

Figure 2:
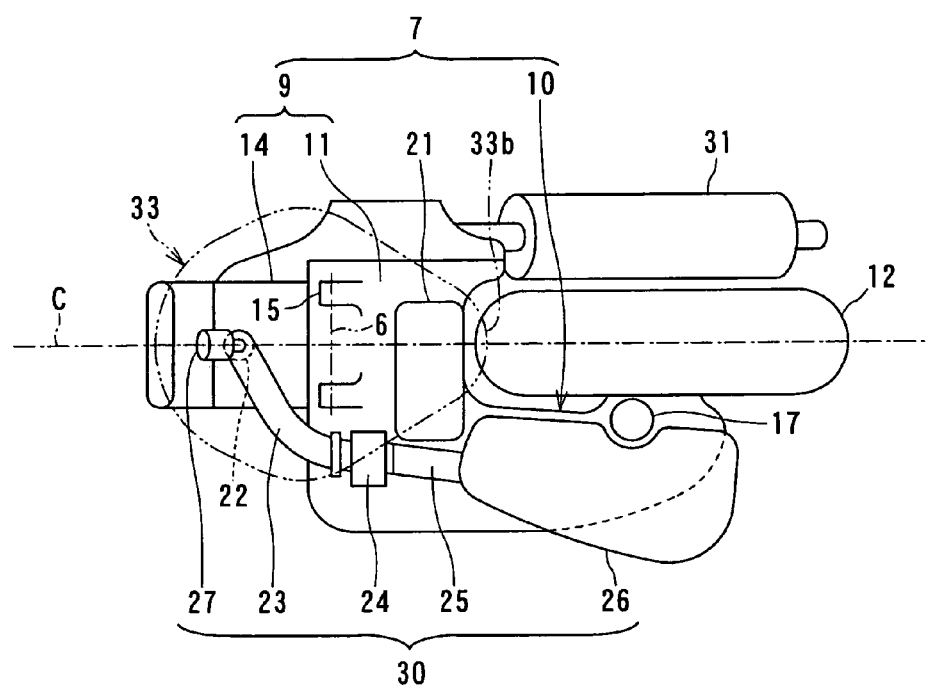
FIG. 2 is a plan view of a structure including a power unit and an article accommodation box of the motorcycle viewed from an arrowed direction II in FIG. 1.

As shown in FIG. 2, a starter motor 21 for starting the engine operation is disposed above the rear portion of the crank case 11 of the engine 9 with its axis being directed to the motorcycle body width direction. An intake port 22 opened to the upper surface of the cylinder 14 of the engine 9 is connected to a throttle body 24 by way of an intake manifold 23, and an air cleaner case 26 is also connected to the throttle body 24 through a suction pipe 25. An injector 27, as a fuel injection device, is disposed at a portion near the front end of the intake manifold 23.

In the above structure, the air cleaner case 26, the suction pipe 25, the throttle body 24, the intake manifold 23 and the injector 27 constitute an intake device or unit 30. The throttle body 24 serves to adjust the intake air supply to the engine cylinder 14 in accordance with operation amount of a throttle grip, not shown, and the injector 27 injects the fuel to the suctioned air to thereby produce air-fuel mixture.

An exhaust muffler 31 extends from the cylinder 14 of the engine 9 once downward and then rearward along the right side of the rear wheel 12. The exhaust muffler 31 and the intake device 30 are swung together with the power unit 7 and the rear wheel 12.

Further, a rider's seat 32 is provided above the rear half portion of the body frame 2, and an article accommodation box (or an article storage chamber) 33 having a bottomed box structure, is also provided below the rider's seat and above the power unit 7 (i.e., engine 9).

The rider's seat 32 is openable upward about a rotational shaft 32a disposed at the front end side thereof, and this rider's seat 32 also contributes as a lid of the article accommodation box 33. That is, when the rider's seat is opened upward, the lid of the article accommodation box 33 is also opened.

A fuel tank 34 is disposed on the rear side of the article accommodation box 33, and an oiling port 34a of the fuel tank 34 is also disposed below the rider's seat 32 and accessed by opening the same.

The motorcycle body is covered substantially entirely by a body cover 36 made of resin to make fine an outer appearance of the scooter-type motorcycle 1 as well as to protect inner machineries thereof. A foot-rest floor (flat foot step) 37 is formed at a lower portion between the handle bar 5 and the rider's seat 32.

The article accommodation box 33 has an inner volume or space capable of sufficiently storing a full-covered type helmet 39 in a state that the top portion of the helmet 39 is directed upward and the front side thereof is directed rearward in the box 33.

The article accommodation box 33 has a flat bottom surface 33a with a slit rearward downward inclination so as to be almost parallel to the axial line 14a of the cylinder (also extending slightly in rearward downward direction) in the side view of the motorcycle body. Furthermore, the article accommodation box 33 is molded so that the rear end portion of the bottom surface 33a is protruded in a circular shape at its central portion as shown in FIG. 2. The article accommodation box 33 is positioned in the longitudinal direction of the motorcycle body so that the rear end portion of the helmet 39 accommodated therein is positioned near the upper portion of the front side end of the rear wheel 12.

The air-cleaner case 26 constituting a part of the intake device 30 is positioned above the power transmission 10, and the air-cleaner case 26, the suction pipe 25, the throttle body 24 and the intake manifold 23 are arranged substantially horizontally from the rear side of the motorcycle body towards the front side thereof. In this arrangement, the throttle body 24 is positioned between the swing shaft 6 disposed at the front upper portion of the crank case 11 and the starter motor 21 disposed at the rear upper portion of the crank case 11.

As shown in FIG. 2, the throttle body 24 and the suction pipe 25 are arranged, on the crank case 11, on the side, for example, left side as viewed, from the center line C of the motorcycle body in the plan view thereof. The intake port 22, to which the intake manifold 23 is connected, is, on the other hand, positioned above the center line C. According to such arrangement or layout, the intake manifold 23 once extends rearward obliquely in the left side and is then curved rearward and connected to the throttle body 24.

In the scooter-type motorcycle 1 of the structure mentioned above, since the throttle body 24 of the intake device 30 is disposed in a deep portion between the swing shaft 6 and the starter motor 21 arranged at front and rear portions above the crank case 11, it becomes possible to prevent the throttle body 24, generally having a large vertical dimension in comparison with the intake manifold 23 and the suction pipe 25, from projecting largely upward over the swing shaft 6 and the starter motor 21.

In addition, according to the arrangement of the present invention, above the starter motor 21, there is only disposed the suction pipe 25 which can be lowered in vertical attitude, and according to such arrangement, the entire height of the power unit can be lowered to thereby produce a sufficient clearance between the power unit 7 and the lower bottom surface 33a of the article accommodation box 33. Thus, it becomes possible to position the bottom surface 33a thereof in a lower level to thereby ensure the inner volume of the accommodation box 33, and moreover, since the vertical level of the rider's seat 32 can also be lowered, improving the riding condition, operability and footing fitness or comfortability of the scooter-type motorcycle 1.

Furthermore, the suction pipe 25 displaced on one side of the motorcycle body is not overlapped, in the plan view of the motorcycle body, with the article accommodation box 33 molded, and the bottom surface portion protrudes rearward in a circular shape at its rear central portion. Accordingly, even in the upper rotational motion of the power unit 7, it hardly interferes with the bottom surface 33a of the article accommodation box 33.

In FIG. 1, showing the left side view of the scooter-type motorcycle 1 of the present invention, although the bottom surface 33a of the article accommodation box 33 is positioned directly above the suction pipe 25, as shown in FIG. 2, both the members 25 and 33 are not overlapped with each other, and hence, the suction pipe 25 does not interfere with the bottom surface 33a at the upper rotation of the power unit 7. Thus, as mentioned before, the bottom surface 33a is set to be lower to thereby increase the inner storage volume or space of the accommodation box 33.

Furthermore, the article accommodation box 33 is molded so as to provide the shape capable of accommodating the full-covered type helmet 39 such that the front side thereof is directed to the rearward in the accommodated state. In addition, since the front side portion of the full-covered type helmet 39 has a radius of curvature smaller than that of the rear side portion thereof, the rear side portion of the accommodation box 33, in the plan view of the motorcycle body, can be molded to provide a sharp shape, which contributes to enlargement of the clearance among the article accommodation box 33, the suction pipe 25 and the throttle body 24.

Still furthermore, according to the scooter-type motorcycle of the present invention of the structure mentioned above, in the side view thereof, the bottom surface 33a of the article accommodation box 33 has the rearward downward inclination to be almost parallel to the axial line 14a of the engine cylinder 14, so that even if the cylinder has the forward upward inclination for the well oil circulation, the cylinder can be substantially free from the interference with the bottom surface 33a of the article accommodation box 33.

Figure 3:
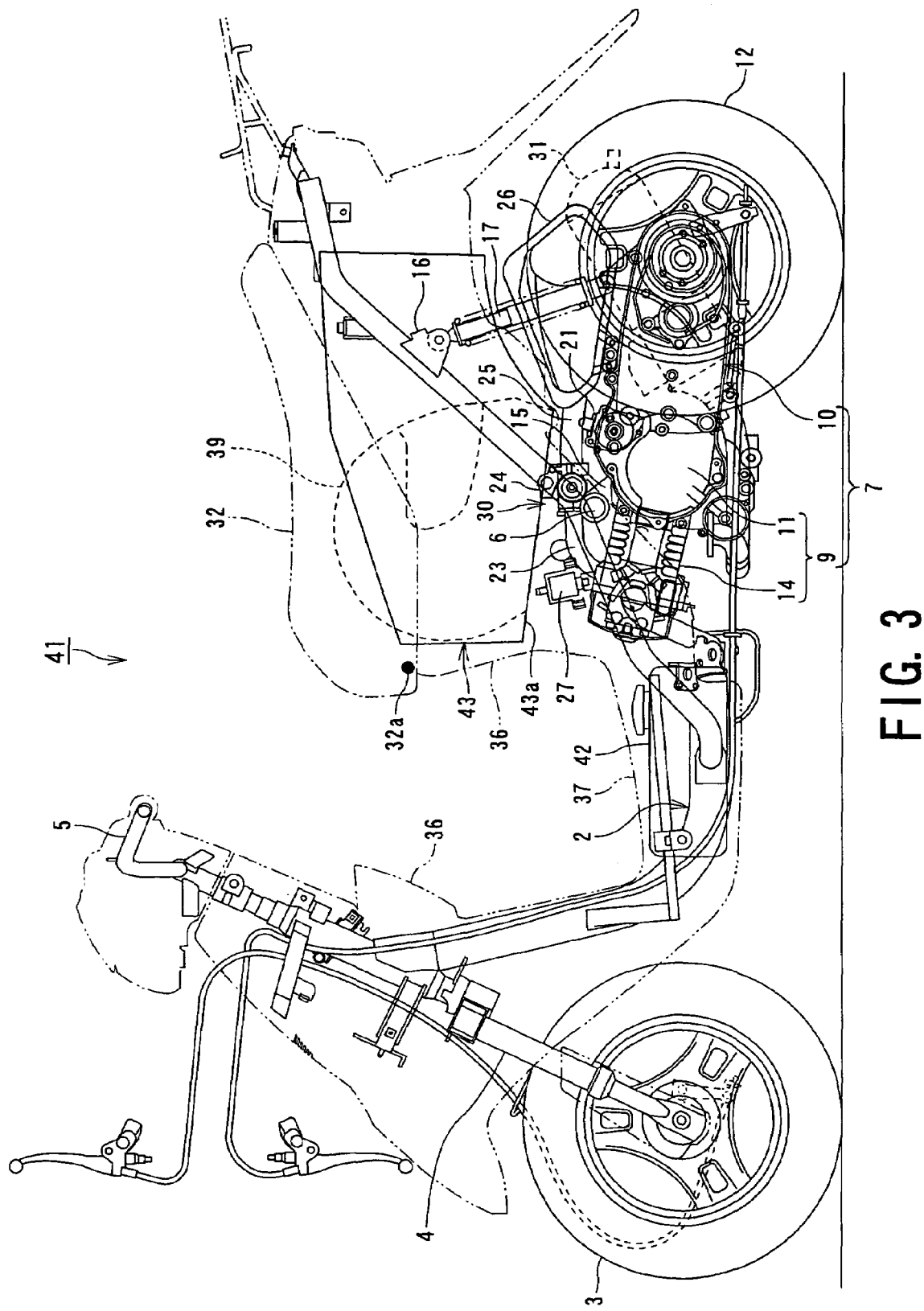
FIG. 3 is a left side view showing a modified embodiment of the scooter-type motorcycle of FIG. 1.
Figure 4:
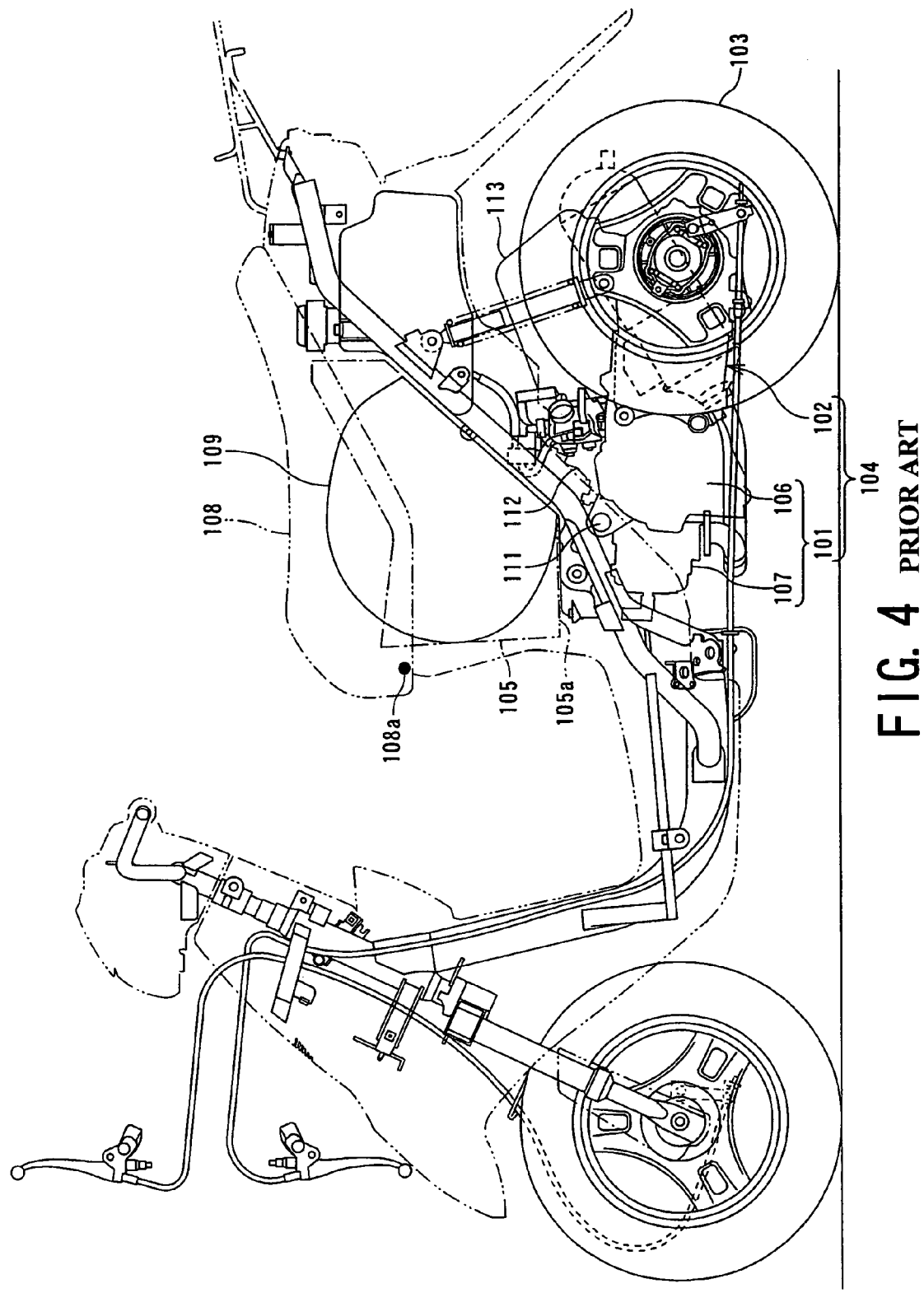
FIG. 4 is a left side view of a scooter-type motorcycle of a conventional structure.

FIG. 3 is a left side view of a scooter-type motorcycle 41 according to another embodiment of the present invention. This scooter-type motorcycle 41 has substantially the same members as those of the scooter-type motorcycle 1 of the first embodiment of FIG. 1 except for the following structure.

That is, in the structure of the motorcycle 41 of this modified embodiment, since a fuel tank 42 is disposed below a foot step floor 37 without disposing the fuel tank 42 at the rear side portion of the accommodation box, the accommodation box 43 can be expanded in the rear direction. The expanded portion has a curved, i.e., inward staged, shape in conformity with the upper contour of the rear wheel 12 so that the rear portion of the bottom surface 43a of the accommodation box 43 does not interfere with the upper portion of the rear wheel 12. Further, the front side portion of the accommodation box 43 has substantially the same shape as that of the motorcycle 1 of FIG. 1.

According to such structure, in which the bottom surface portion 43a of the accommodation box 43 can be expanded in the rear direction in the upward staged shape, the full-covered type helmet 39 can be accommodated without shifting it rearward in the accommodation box 43, and accordingly, another article can be additionally stored therein, thus being convenient.

Further, it is to be noted that the present invention is not limited to the described embodiments and other changes and modifications may be made without departing from the scopes of the appended claims.

What is claimed is:

1. A scooter-type motorcycle having a structure in which an article accommodation box having an upper opening is disposed below a rider's seat which is upward openable, and a power unit including an engine and a power transmission is disposed below the article accommodation box to be vertically swingable together with a rear wheel, said engine including a crank case from which a cylinder extends forward, wherein a swing shaft of the power unit is disposed above a front portion of the crank case, a starter motor for starting an operation of the engine is disposed above a rear portion of the crank case, an engine intake device, including an air cleaner, a suction pipe, a throttle body and an intake manifold, which are arranged substantially horizontally from a rear side portion of a motorcycle body towards a front side portion thereof, is connected to the engine, and the throttle body is disposed between the swing shaft and the starter motor.

2. The scooter-type motorcycle according to claim 1, wherein said throttle body and said suction pipe are disposed in a manner offset from a longitudinal center line of the motorcycle body on one side in a width direction thereof in a plan view, and the article accommodation box has a bottom surface portion having a rear side end which is circularly protruded outward at a central portion thereof.

3. The scooter-type motorcycle according to claim 1, wherein said article accommodation box has an inner space in which a full-covered type helmet is accommodated with a top portion thereof directed upward and a front side portion directed rearward.

4. The scooter-type motorcycle according to claim 1, wherein said article accommodation box has a bottom surface having an inclination rearward downward in a side view of the motorcycle body.

5. The scooter-type motorcycle according to claim 1, wherein said engine cylinder extends forward slightly upward from a front surface portion of the crank case.

6. The scooter-type motorcycle according to claim 1, wherein a fuel tank is disposed on a rear side of the article accommodation box and the fuel tank has an oiling port disposed below the rider's seat.

7. The scooter-type motorcycle according to claim 1, wherein a low-floor type step board is provided for the body frame and a fuel tank is disposed below the step board.

8. A scooter-type motorcycle comprising:
a motorcycle body frame having a low framework structure;
a front wheel and a rear wheel which are operatively supported by the body frame;
a rider's seat disposed at a rear side upper portion of the body frame to be upward openable;
an article accommodation box having an upper opening and disposed below the rider's seat;
a power unit including an engine and a power transmission and disposed below the article accommodation box to be vertically swingable together with the rear wheel, said engine including a crank case from which a cylinder extends forward;
a swing shaft disposed above a front portion of the crank case for coupling the power unit to the body frame;
a starter motor disposed above a rear portion of the crank case for starting an operation of the engine; and
an engine intake device connected to the engine, said engine intake device including an air cleaner, a suction pipe, a throttle body and an intake manifold, which are arranged substantially horizontally from a rear side portion of the motorcycle body towards a front side portion thereof, and said throttle body being disposed between the swing shaft and the starter motor.

\* \* \* \* \*